United States Patent [19]

Wintrell

[11] 4,153,426
[45] May 8, 1979

[54] SYNTHETIC GAS PRODUCTION

[75] Inventor: Reginald Wintrell, Brecksville, Ohio

[73] Assignee: Arthur G. McKee & Company, Independence, Ohio

[21] Appl. No.: 816,360

[22] Filed: Jul. 18, 1977

[51] Int. Cl.$^2$ .............................................. C01J 3/20
[52] U.S. Cl. ...................................... 48/73; 48/86 A; 48/113; 48/197 R; 48/202; 266/182; 266/186; 266/197; 431/158
[58] Field of Search .................... 48/113, 76, 77, 71, 48/73, 62 A, 75, 63, 86 A, 98, 99, 95, 197 R, 200, 202, DIG. 2, 210; 266/182, 186, 188, 197; 110/28 F, 28 R, 31; 431/158; 75/42, 41

[56] References Cited

U.S. PATENT DOCUMENTS

| 2,088,368 | 7/1937 | Falconer et al. | 48/76 |
|---|---|---|---|
| 2,216,792 | 10/1940 | Stryker | 48/76 |
| 2,476,760 | 7/1949 | Ohlsson | 48/76 |
| 2,516,141 | 7/1950 | Newman et al. | 48/76 |
| 2,833,643 | 5/1958 | Newman | 75/41 |
| 2,919,185 | 12/1959 | Wahlberg | 48/202 |
| 3,727,562 | 4/1973 | Bauer | 110/28 F |
| 3,966,457 | 6/1976 | Limpach et al. | 75/42 |

Primary Examiner—S. Leon Bashore
Assistant Examiner—George C. Yeung
Attorney, Agent, or Firm—Bosworth, Sessions & McCoy

[57] ABSTRACT

Disclosed is a method and apparatus for producing synthetic gas by using a blast furnace as a gasifier. The furnace is charged in a conventional manner with particles of solid carbonaceous material such as normal, low grade or undersized coke together with slag-producing material, such as limestone, silica and/or basic oxygen furnace and/or open hearth furnace slag. Fluent fuel such as pulverized coal mixed with oxygen-containing gas and with lime if desired is injected into pre-ignition chambers near the hearth line of the furnace. The fluent fuel is ignited and partially gasified in the pre-ignition chambers, creating a hot reducing gas that enters the furnace raceway and passes upwardly into and through the body of charge material in the furnace stack. At the resulting high temperatures ash from the fluent fuel liquifies within the system to provide a liquid slag. Under a controlled high temperature reducing atmosphere, the liquid lime removes essentially all sulfur from the product gas. To reduce the high gas temperature, steam is injected above the pre-ignition chambers. The steam reacts with the hot solid carbonaceous material in the stack to disassociate and enrich the product gas with additional hydrogen and carbon monoxide. Liquid carbonaceous material such as oil, tar, or the like is injected into the furnace stack above the location at which steam is injected and is cracked by the sensible heat of the gas passing through the body of charge material in the furnace, thus further cooling the gas and enriching its calorific value.

The resulting product gas can be used in place of natural gas for heating purposes in steel making operations, as a gas in the production of chemicals, as a reducing gas for the metals industries, for general heating purposes, as well as for other purposes.

41 Claims, 4 Drawing Figures

SYNTHETIC GAS PRODUCTION

DISCLOSURE OF THE INVENTION

BACKGROUND OF THE INVENTION

This invention relates to method and apparatus for producing synthetic gas that can be used for various purposes, such as heating, reducing, chemical synthesis or reaction, and more particularly method and apparatus for producing such gas by using a large volume shaft furnace which is preferably a blast furnace.

The invention may be used for the production of large quantities of gas that may be used for various purposes, as for fuel gas for heating purposes, or as a reducing gas useful in the metals industries, or gas high in hydrogen and carbon monoxide suitable for the production of methane, methanol, gasoline, or as a starter material for chemical synthesis, or a shifted gas high in hydrogen content for ammonia synthesis as for fertilizers, or for hydrogenation of coal or oil to produce other useful gases or liquids or peterochemicals. However, it provides important high temperature advantages when used for heating purposes as in steel mills, and therefore, it will be discussed hereinafter primarily in connection with such use.

Shortages of natural gas and fuel oil, both current and future, have caused and can cause far-reaching and troublesome problems in the steel making industry which has heretofore used natural gas or fuel oil in substantial quantities for heating purposes, such as soaking pits and reheating furnaces, or for performing or aiding in performing reduction of iron oxides, and for other purposes.

Natural gas has been desirable not only because of its convenience in handling, but also because of its cleanliness and because its products of combustion in general do not provide problems from the environmental standpoint. Availability of suitable gas for use in steel making therefore is of major concern in the steel making industry.

The present invention provides method and apparatus whereby suitable synthetic gas for steel making activities can be produced in large quantities by using a blast furnace as a gasifier, preferably with minor modifications that can be such as to permit the furnace to be used either as a gasifier, or alternatively in the usual manner for reduction of iron oxides to produce metallic iron with the advantage of coal and oxygen injection.

The present invention provides important advantages. The rate of production of gas produced by a blast furnace used as a gasifier according to the invention can be far greater than the rate of production of gas by the largest available commercial gasifiers heretofore used. Since the invention makes possible the use of existing blast furnaces, particularly those which are not used because of economic conditions or obsolescence, it provides gasifiers having low capital costs. Moreover, the invention makes possible the production of gas with minimal carbon dioxide, and thus provides a potential for maximum utilization of carbon and oxygen. It also makes possible substantially complete removal of sulfur from the gas. The invention also makes possible the production of usable gas from various solid and liquid fuels such as coal, coke, fuel oil, or of by-product or waste materials such as low grade or undersized coke, selected municipal wastes, basic oxygen furnace slag, open hearth slag, and other materials of low economic value.

When modified and operated according to the present invention, a smaller, usually obsolete, blast furnace can generate four to six times as much gas as the largest presently operating commercial gasifier, while a blast furnace of the largest size presently operating can generate more than thirty times as much gas as the largest commercial gasifier now in operation, at much lower costs of capital investment and operation.

Gas that is normally produced by blast furnaces when operating to reduce iron oxide has a calorific content of about 85 BTU/SCF, too low for general industrial purposes. The process and apparatus of the invention, on the other hand, can produce gas having a BTU content of about 300 to 450 BTU/SCF or even higher, which makes this gas useful in most industrial services.

Moreover, blast furnaces used to produce gas according to the invention for use in steel mills are generally located in close proximity to other industrial locations, where availability of surplus gas is highly advantageous.

The time required to place blast furnaces in commercial production as gasifiers can be a minimum because of the availability and strategic location of existing idle furnaces.

Use of blast furnaces as gasifiers makes possible utilization of commercial technology in the conversion of coal and by-product industrial fuels to synthetic fuel gas in the large quantities that industry requires, at minimum cost, in minimum time, and with maximum efficiency.

The present invention therefore provides a practical, economical alternative to production curtailments and unemployment caused by shortages of natural gas or other fuels. Gas produced according to the present invention can meet both industry needs and satisfy enviromental requirements.

SUMMARY OF THE INVENTION

An object of the invention is to provide method and apparatus for producing by use of a blast furnace or similar shaft furnace substantially sulfur-free gas having a desired substantial calorific or BTU content within a substantial range of BTU contents, according to which method and apparatus particulate solid carbonaceous material in the general size range of burden material normally charged into blast furnaces, such as low grade or undersized coke together with slag producing flux material such as lime, limestone, or basic oxygen furnace or open hearth slag or mixtures thereof, is charged into the furnace in known manner to form a body of charge material in the furnace. Fluent fuel, such as finely divided or pulverized coal, waste solid fuel by-products such as low grade or undersized coke, coal, char, or petroleum coke, mixed with oxygen-containing gas and with lime of desired, is injected through pre-ignition chambers into the furnace hearth above the level of slag. The fuel is ignited and partially gasified in these chambers, and the resulting hot gaseous products enter the furnace and permeate upwardly into and through the body of charge material its to raise the temperature. The ash, flux material and possible silica additions on heating melt to produce a slag that forms in the furnace a liquid pool which can be periodically tapped. During the process, lime-containing liquid flux under essentially complete reducing conditions absorbs the sulfur and ash produced in the furnace from the gasification of the carbonaceous fuels.

Steam is injected above the hearth to control the temperature in the shaft or stack of the furnace. The steam endothermically reacts with hot solid carbonaceous material such as coke in the body of charge material, to disassociate essentially according to the water gas reaction and increase the gas volume passing upwardly through the body of charge material by the addition of hydrogen and carbon monoxide. The quantity of steam injected is controlled to cool the gas but not below a temperature that is satisfactory for the disassociation. Iron oxide in the body of charge material in the furnace, as from either basic oxygen furnace slag or iron ore, provides a beneficial catalytic effect on this reaction.

Liquid or vaporized carbonaceous material such as oil, tar, asphalt, liquified plastic scrap, or other similar material is injected into the furnace stack above the location at which steam is injected. The sensible heat remaining in the gas passing through the body of charge material in the upper stack portion cracks such injected material, thus lowering the gas temperature. As it cracks, the injected material carburets the gas in a controlled manner by combining with hydrogen to form hydrocarbons and thus enriching the BTU value of the product gas. As necessary or desirable, the gas discharging from the blast furnace may be further cooled and cleaned by conventional procedures and apparatus.

Such blast furnace gas can be used in place of natural gas in steel mills, as for heating soaking pits, or reheating furnaces, or can be used by injection into a blast furnace to replace coke, or can be used as a reducing gas in direct reduction processes and apparatus. It can be used for other purposes, including for heating spaces occupied by persons.

DESCRIPTION OF DRAWINGS

These and other advantages and features of the invention will be apparent from the following disclosure of a preferred embodiment in connection with the accompanying drawings in which.

DISCLOSURE OF PREFERRED EMBODIMENT

Figure 1:
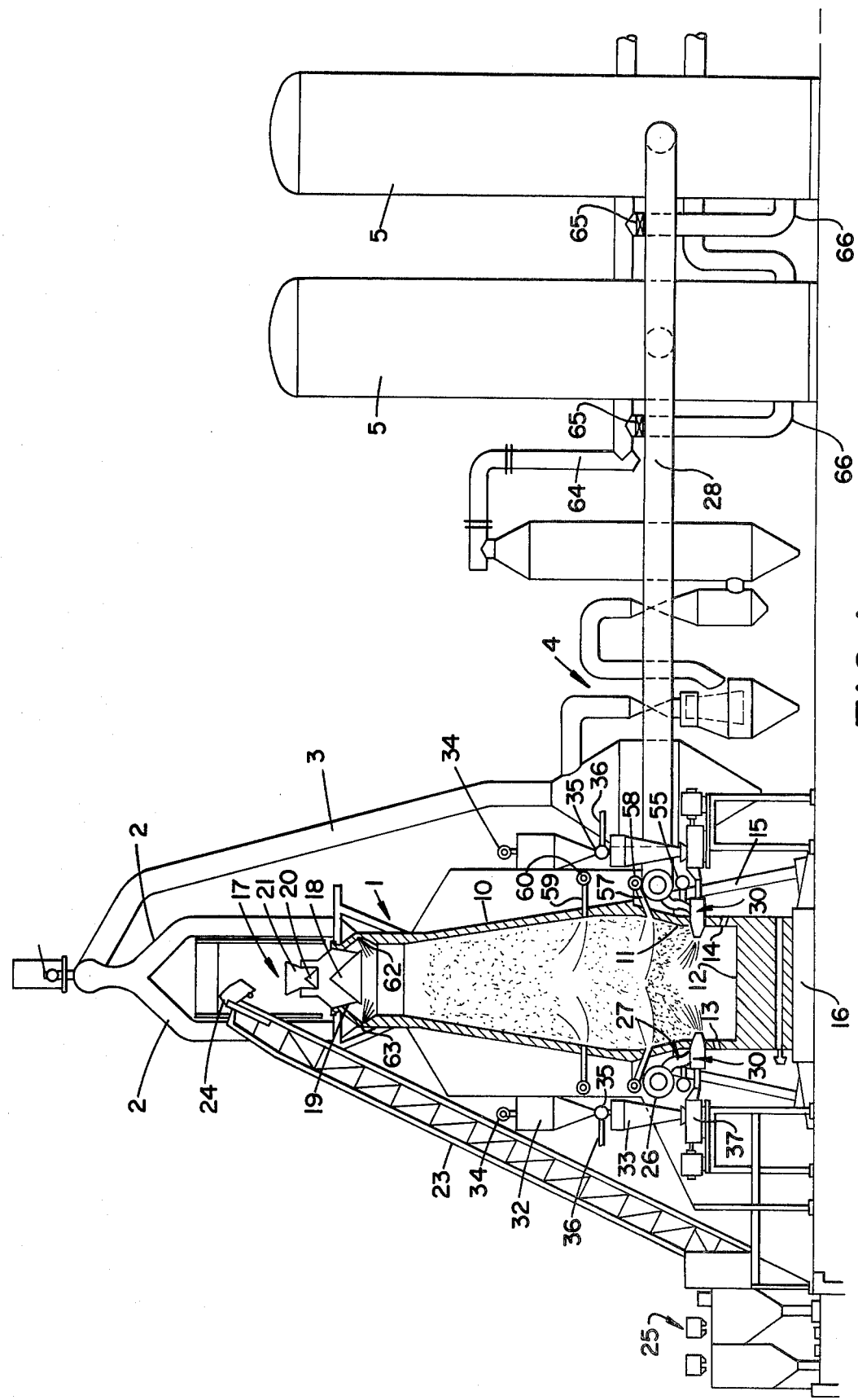
FIG. 1 is a somewhat diagrammatic elevational view of a blast furnace installation embodying the invention, the furnace being shown in vertical section for clarity of disclosure.

In the embodiment of the invention shown in the drawings, 1 designates a blast furnace of essential known construction having at its top a plurality of gas collecting uptake conduits 2 connected to a downcomer conduit 3 that discharges the product gas into known gas cleaning equipment 4. Known blast furnace stoves 5 are provided to heat air supplied to the furnace.

Furnace 1 comprises a shaft or stack 10 of known construction, the lower portion of which includes a bosh 11 and a hearth portion 12 having a slag notch 13, and an iron notch 14 if desired.

The stack of the furnace is supported by known supporting means 15, the hearth portion being supported by known means 16. The upper portion of the stack terminates in known charging means 17, which as diagrammatically shown in the illustrated embodiment comprises a large bell 18 and its hopper 19, and small bell 20 and its hopper 21, the bells being adapted to be lowered and raised by known means, not shown, to open and close their respective hoppers for charging purposes in known manner to prevent loss of furnace pressure and gas. The installation includes furnace feeding means including a skip bridge 23 and skip car 24 to supply charge material to the furnace, the feeding means being supplied with burden material by known means 25.

In the illustrated apparatus a bustle pipe 26 of known construction surrounds the bosh and has connected to it tuyeres 27 that discharge into the furnace as desribed later. The bustle pipe is connected by a hot blast pipe 28 to the stoves 5 in known manner to conduct heated air from the stoves to the furnace.

A plurality of pre-ignition chambers 30 (FIGS. 2–4) for gasifying solid fuel supplied to the chambers are spaced around the upper portion of the hearth, preferably at equal intervals, to discharge into the furnace, preferably through the tuyere openings 31.

In the illustrated apparatus, moreover, at each pre-ignition chamber 30 there is located a pair of superposed upper and lower hoppers 32 and 33. Fluent finely divided or powdered solid carbonaceous fuel such as comminuted anthracite coal, steam coal, lignite or other suitable coal, or comminuted waste or by-product carbonaceous material such as breeze or undersized coal, coal char, or petroleum coke, is supplied under moderate pressure to each upper hopper 32 from a conduit 34. Finely divided slag-forming material such as limestone or lime may be intermixed with such carbonaceous fuel. Preferably the finely divided material introduced into the hoppers is such that about 70 to 80% of each finely divided constituent will be less than 200 mesh.

Each upper hopper 32 communicates with its associated lower hopper 33 through a suitable known valve 35 which may also be connected to a pipe 36 for supplying suitable gas, such as nitrogen, under moderate pressure to the lower hopper. The lower end of each lower hopper communicates with feeding means 37 that feeds the finely divided material from each pair of upper and lower hoppers to the interior of the associated pre-ignition chamber.

Each pair of hoppers 32 and 33 is operated so that finely divided carbonaceous fuel, preferably intermixed with slag-forming material such as limestone or lime, is controlled and fed from the lower hopper 33 into the associated pre-ignition chamber 30 and thereafter into the furnace. As the finely divided fuel in the lower hopper 33 approaches a set low limit, valve 35 is opened and the lower hopper is filled to a set upper limit from the upper hopper, after which the valve is closed and the upper hopper is refilled as required. Suitable known low and high level alarm or control means preferably are provided to control the supply of finely divided fuel in the upper and lower hoppers to permit uninterrupted flow of fuel into the pre-ignition chambers 30.

Figure 2:
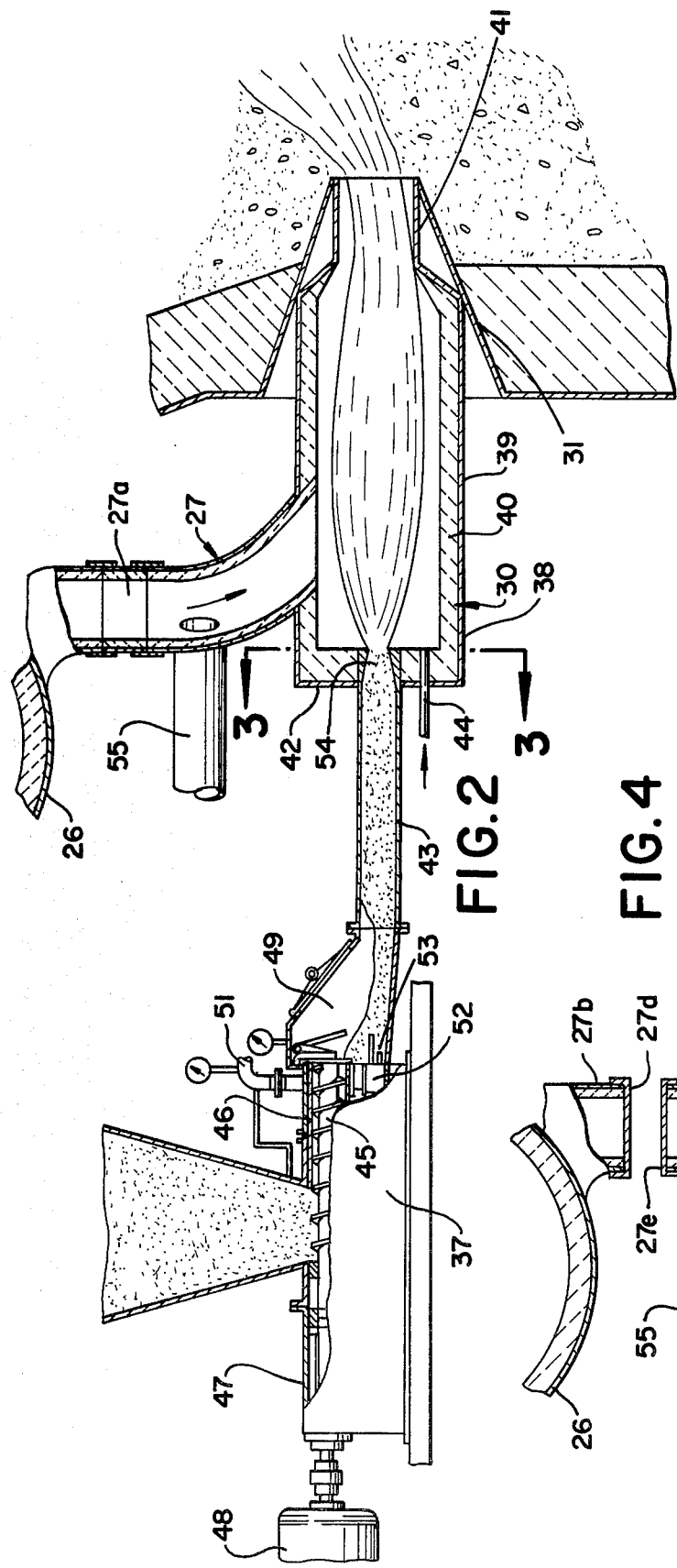
FIG. 2 is a detail to a larger scale showing one of the pre-ignition chambers, in vertical section, and associated fuel feed means.
Figure 3:
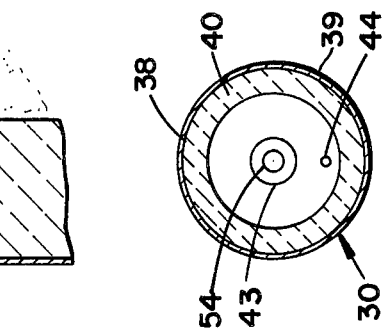
FIG. 3 is a cross sectional view of the pre-ignition chamber along line 3—3 of FIG. 2 and to the same scale.
Figure 4:
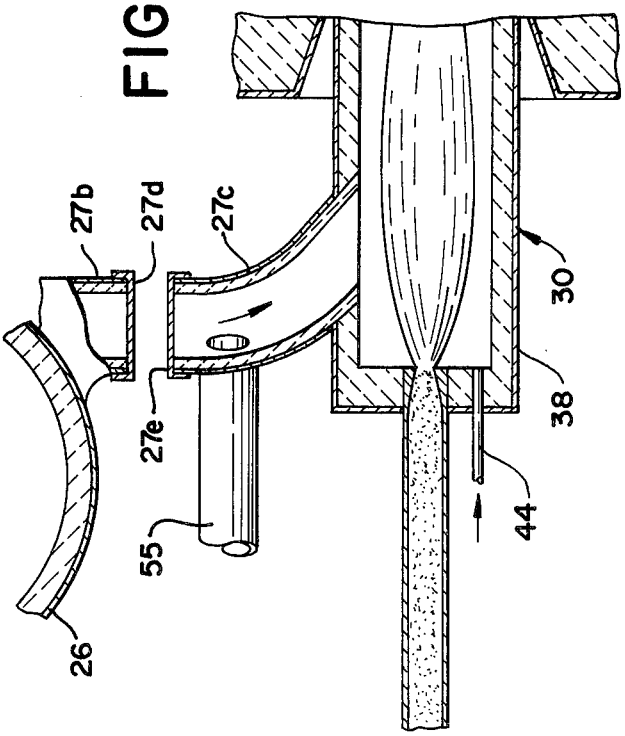
FIG. 4 is a detail to the scale of FIGS. 2 and 3 showing how the tuyeres can be disconnected from the bustle pipe.

As shown in larger scale in FIGS. 2, 3, and 4, each pre-ignition chamber 30 in the illustrated embodiment comprises an enclosure 38 of generally elongated cylindrical configuration comprising a steel outer shell 39 that is lined with suitable known refractory heat resistant material 40 capable of withstanding high flame temperatures, suitable known type of means for cooling the enclosure walls being provided if desired. The enclosure has a discharge end 41 of a cross section that fits into a tuyere opening 31 of the furnace and is adapted to discharge into the furnace. The enclosure also has an inlet end 42 connected to conduit 43 connected to the feed means 37. A known type of preheating burner 44 is adapted to discharge into the inlet end of the enclosure for preheating and initial ignition purposes. A tuyere 27 also discharges into the enclosure 38.

Each illustrated feed means 37 is of a known type, a Fuller-Kinyon pump, comprising a helically vaned conveyor member 45 mounted for rotation about a lateral axis in a barrel portion 46 of a suitable housing 47, and rotated by power means such as electric motor 48. Housing 47 has an upper opening connected to the bottom of one of the lower hoppers 33 which discharges the finely divided carbonaceous fuel and other finely divided material into the barrel portion of the housing in which the vanes of the conveyor member 45 closely fit. As member 45 rotates its vanes convey the material to the discharge portion 49 of the feed means, which is connected gas-tight to conduit 43.

Propelling gas, such as air, steam, oxygen, fuel gas, or an inert gas, supplied from a conduit 51, is discharged through conduit 52 and nozzles 53 into discharge portion 49 and conduit 43 in sufficient volume and at pressure adequate to entrain the finely divided solid material supplied from conveyor member 45 and discharge it, at a velocity in excess of the speed of flame propagation, through conduit 43 and its nozzle 54 into the associated pre-ignition chamber 30. In such chamber, the finely divided solid carbonaceous fuel is ignited, and partially burned; and from such chamber a blast of hot reducing gases and unburned finely divided particles of carbonaceous material is discharged into the raceway of the furnace.

In the illustrated embodiment, a pipe 55 connects the lower portion of tuyere 27 to a source of oxygen of substantial purity, to supply such gas when desired.

The tuyere is also shown in FIGS. 1-3 as connected to the bustle pipe 26. In such case, a large portion if not all of the oxygen required for ignition in the pre-ignition chamber and for gasification of the fuel in the furnace can be provided in hot blast air supplied from the bustle pipe 26 through tuyeres 27, or in oxygen supplied through pipes 55, and lesser portion of the oxygen can be supplied from the feed means 37. If it is desired not to supply any air from the bustle pipe, each tuyere may be closed off from the bustle pipe; one means for accomplishing this is shown in FIG. 4, in which a removable section 27a (FIG. 2) of the tuyere is removed and the resulting open ends of the tuyere sections 27b and 27c closed gas tight by caps 27d and 27e.

Particulate solid carbonaceous fuel, which may be low grade or undersized metallurgical coke or suitable coal, is charged in known manner into the furnace through the known charging means 17 at the furnace top, along with limestone or basic oxygen furnace (B.O.F.) slag or open hearth (O.H.) slag to form a body of charge material in the stack of the furnace. Preferably the particle size of such material is within the size range of the particle size of burden material normally used in conventional blast furnace practice.

Finely divided solid carbonaceous fuel with or without lime or limestone or other material, that is supplied to the upper and lower hoppers 32 and 33 is fed through each feed means 37 through conduits 43 to the associated pre-ignition chamber 30 along with the oxygen-containing gas. Such gas may be heated air supplied from the bustle pipe 26 and tuyeres 27, or oxygen from the pipes 51 or 55 or both, or from both the bustle pipe and such oxygen supply means.

If hot blast air is introduced into the chamber 30 and into the furnace operating as a gasifier, the preferred temperature of the air without oxygen enrichment is about 2000° F. However, hot blast air down to a temperature of about 1500° F. could be used without oxygen enrichment although this is not as desirable.

If, as may be the case in older blast furnace installations, the blast furnace stoves cannot produce hot blast air at temperatures much above 1200° F., oxygen may be added to the hot blast air by use of the illustrated apparatus, or the coal to coke ratio lowered.

To produce blast gas of the highest feasible BTU content, essentially pure oxygen is introduced into the pre-ignition chambers 30. The oxygen preferably should be preheated to about 220° F. although oxygen at higher or lower temperatures, or even unheated oxygen could be used. For product gas having a BTU content that is higher than is possible with air alone as the introduced gas, and lower than is possible with pure oxygen alone, an air-oxygen mixture, preferably heated, may be used in the process.

If high purity oxygen is introduced into the pre-ignition chambers for pre-ignition of the fuel, the resulting hot gasses passing into the furnace used as a gasifier from the pre-ignition chambers 30 may comprise about 60 to 70% of carbon monoxide, 20 to 30% of hydrogen and a remainder being essentially nitrogen, carbon dioxide and hydrogen sulfide, if the dimensions of the pre-ignition chambers and fuel and gas supplied to the chambers are such that all oxygen gas that is supplied to the chambers becomes combined during combustion in the chambers. If hot blast air alone is introduced into the pre-ignition chambers under such conditions, the resulting hot gases introduced into the furnace contain a substantially higher proportion of nitrogen. If a mixture of air and oxygen gas is introduced under such conditions the proportion of nitrogen will be smaller. The dimensions and conditions in the chambers may also be established so free gaseous oxygen is present in the hot gases discharged from the pre-ignition chambers into the furnace.

The pre-ignition chambers produce important benefits. If the pre-ignition chambers were not used, and cold finely divided solid fuel should be injected directly into the furnace, as through tuyeres, this cold fuel would compete with the hot coke in body of charge material in the furnace for any oxygen available in the furnace. This would impose a low limit on the ratio of the finely divided fuel to coke that could be properly gasified, as occurs in a blast furnace under conventional iron oxide reducing conditions in which the highest radio of finely divided solid carbonaceous fuel introduced through the tuyeres and efficiently utilized, to the coke in the furnace, is about one to five.

According to the invention, on the other hand, in the pre-ignition chambers the injected finely divided carbonaceous fuel ignites, commences burning, and is heated to a high temperature before the mixture of hot unburned fuel and hot gases is introduced into the furnace.

Each pre-ignition chamber will ignite, burn, heat and gasify the finely divided solid fuel in the presence of oxygen and in the absence of the hot coke of the body of charge material in the furnace. The heat released and the associated temperature rise in the pre-ignition chamber releases any as-yet unburned finely divided solid fuel into the furnace at high temperatures on the same order as those of the coke in the furnace in the vicinity of the hearth.

Therefore, the problem stated above is considerably minimized. Consequently, pre-ignition, precombustion of the finely divided solid fuel in the pre-ignition chambers with oxygen or oxygen-air as the gas permits the achievement of a substantial increase in the ratio of finely divided fuel to furnace coke that is utilized, for the following reason, among others.

Since the temperature of the injected finely divided solid fuel is thus increased prior to its entry into the furnace, its reactivity is increased, thus enhancing its competitive position relative to the hot furnace coke and enhancing its gasification by reaction with oxygen available in the furnace as free oxygen or in carbon dioxide. Consequently, according to the invention, it is possible to efficiently gasify in the furnace about five or more times as much finely divided carbonaceous material introduced through the pre-ignition chambers as is consumed as coke top-charged into the furnace.

Since ignition and establishment of combustion of the injected carbonaceous material occurs in the pre-ignition chambers, temperatures of about 3000° F. to about 3600° F. and preferably 3300° F. to about 3500° F. exist in the chamber during gasification. Such temperatures are sufficient to cause essentially complete disassociation of ammonia, phenols, tars, and other condensible hydrocarbons in the coal or other finely divided carbonaceous material. The temperatures are also sufficient to melt the fuel ash and flux material in the body of charge material in the furnace to form liquid slag.

The hot gases resulting from gasification of the injected finely divided solid fuel and the carbonaceous fuel in the body of charge material in the furnace are in the neighborhood of 2800° F. inside the furnace and immediately above the hearth. These gases travel upwardly through the body of charge material in the furnace stack, permeating such body. In the illustrated embodiment, at a substantial distance above the hearth where the temperature in the furnace is between about 2600° F. and 2800° F., steam is introduced through nozzles 57 from conduits 58 to control the gas and reduce its temperature. These nozzles are disposed around the stack, preferably equidistantly and equiangularly. The steam reacts with the carbon in the carbonaceous material in the body of charge material in the furnace stack in a reaction similar to that in known water gas gasification units to enrich the gas flowing upwardly through the burden by the addition of hydrogen and carbon monoxide, and to cool the gas in the stack. The amount of injected steam preferably is calculated only to cool the gas to a temperature between about 1000° F. to about 1800° F., and preferably to a temperature of between about 1500° F. to 1600° F., since the steam-carbon disassociation is usually unsatisfactory below a temperature of about 1500° F. The iron oxide in the B.O.F. slag or in the iron one in the body of charge material in the furnace, if such is used, provides a beneficial catalytic effect on the steam-carbon reaction by promoting the reaction kinetics. This, and the preheating of the charge material in the body of the furnace as the gas is passed upwardly from the zone of steam injection, can cool the product gas down to acceptable exit temperatures for certain uses.

However, according to the invention, it is preferable to cause controlled carburetting of the gas higher in the stack, to further reduce the gas temperature and additionally enrich the calorific or BTU content of the product gas. This is done by injecting liquid carbonaceous material, such as fuel oil, tar, asphalt, liquified waste plastic material, or other suitable liquified or vaporized carbonaceous material into the furnace and the body of charge material therein to contact the hot gas while it is at a temperature between about 1000° F. to about 1800° F., and preferably about 1500° F., sufficient to crack the injected liquified carbonaceous material. Such material is injected through nozzles 59 fed by conduits 60 and separate from and located a substantial distance above nozzles 57 through which steam is injected. Nozzles 59 are disposed around the stack, preferably equiangularly and equidistantly. The sensible heat of the gas, which has been enriched by water gas, passing through the burden in the vicinity of the nozzles 59 cracks the liquid carbonaceous material injected by such nozzles, thus lowering the temperature of the gas in the burden. Moreover, such cracking carburets the gas and combines it with hydrogen to form hydrocarbons that increase the calorific value of the product gas to between about 300 to about 450 BTU/SCF or even higher.

It is advantageous to separately inject the steam and liquid carbonaceous material at separate locations spaced in an upward direction, as in the illustrated embodiment, in which locations furnace temperature is higher at the location where steam is injected than at the location where the liquid carbonaceous material is injected. The steam-coke reaction occurs more effectively at temperatures higher than those at which the carburetting action occurs. Thus, the steam-coke reaction occurs best at temperatures of at least 1500° F. and ranging upwardly to the hearth temperatures in the illustrated apparatus, while the carburetting action generally occurs more effectively at lower temperatures, as between about 1000° F. and about 1500° F. Furthermore, when as in the illustrated embodiment, the steam-coke reaction occurs before the carburetting reaction, it can generate substantial added hydrogen that is useful in the hydrogenation of the liquid carbonaceous material, thus aiding in increasing the calorific value of the synthetic product gas.

If desired, the product synthetic gas can be further cooled by water sprays 62 provided by suitable known means 63 in the upper portion of the furnace, before the gas leaves the furnace through the uptake conduits.

In the illustrated apparatus the gas then passes through the downcomer conduit 3 into the gas cleaning system 4 which preferably is a known venturi gas cleaning system. The product gas then passes through conduit 64 to its ultimate use. However, by suitable operation of valve means 65 a portion of the gas may be diverted to a conduit 66 which passes it to a blast furnace stove in which it is burned to heat the stove checkerwork and thus provide heat for hot blast air in the conventional manner.

The temperature at the hearth resulting from pre-ignition and gasification of the injected finely divided solid fuel is high enough to cause melting and reduction of the blend of ash, lime and possible silica additions according to slag chemistry normally associated with blast furnace practice. The slag forms within the hearth portion of the furnace a pool of molten liquid slag that can be removed from time to time through the slag notch 13. Moreover, if B.O.F. or open hearth slag is used in the body of charge material in the furnace to provide lime, the iron values in such slag can be recovered as molten blast furnace type iron during the process of the invention. Such molten iron forms as a pool on which the slag pool floats; such iron can be tapped off from time to time through the iron notch 14.

In operation of the furnace under essentially complete reducing conditions at the hearth, sulfur from the gasified solid fuel will be absorbed by the liquid lime to make possible, according to the invention, a product gas that is essentially free of sulfur.

In the steel industry, gas from gasifiers of the type described can be used for heating soaking pits, reheating furnaces, coke ovens, normalizing annealing furnaces, foundry core ovens, and for drying hot tops and linings in blast furnaces, steel ladles, blast furnace runners, as well as for other uses where natural gas or blast furnace gas is normally used.

Furthermore, gas produced by gasifiers as contemplated by the invention may be used for other purposes, such as a reducing gas for direct reduction of metal oxides, or as a synthesis gas for the manufacture of chemical products, or under suitable conditions for heating spaces intended for human or animal occupancy.

Various modifications may be made in the method and apparatus disclosed above as embodying the invention. Thus, other types of shaft furnaces, preferably large volume furnaces, and preferably existing furnaces, could be used as gasifiers if modified to carry out the process of the invention.

Other types of solid and liquid fuels or carbonaceous material than those mentioned above may be used, although those indicated have economic or practical advantages and some of the waste or by-products that may be used involve disposition costs. Other types of flux materials may be used, although basic flux materials, such as those disclosed, are preferably known to remove sulfur from the gas.

Shaft furnace apparatus embodying the features of the present invention may also advantageously be used for purposes other than as gasifiers. Thus, in shaft furnaces in which it is desirable to inject fuel into the lower part of the furnace as at a tuyere level, the use of pre-ignition chamber means, preferably involving the use of several pre-ignition chambers spaced around the furnace, can be very advantageous in making possible the injection into the furnace, and efficient utilization in the furnace, of finely divided solid carbonaceous fuel material, which may be comminuted undersized coal or breeze coke or other material that would otherwise be waste material but has substantial fuel value.

The apparatus illustrated as embodying the invention may be modified in various manners, without departing from the invention. The various types of means for introducing solid fuel, steam, oil, tar, asphalt or other materials that are shown are illustrative.

While the invention has been disclosed with respect to specific embodiments of the process and apparatus, this is intended for the purpose of illustration rather than limitation; other variations and modifications of the specific embodiments herein shown and described will be apparent to those skilled in the art, all within the intended spirit and scope of the invention. Accordingly, the patent is not to be limited to the specific embodiments herein disclosed nor in any way that is inconsistent with the extent to which the progress of the hart has been advanced by the invention.

What is claimed is:

1. A method of manufacturing synthetic gas having a substantial calorific content, in a large volume slag type shaft furnace such as a blast furnace having a hearth in the lower portion thereof and a shaft above the hearth, which method comprises charging through the top of said furnace charge material comprising particulate solid carbonaceous material and slag-producing flux material in a size range of particles of material normally charged into a blast furnace in conventional blast furnace practice, to form a body of said charge material in the shaft of said furnace, introducing finely divided solid carbonaceous material and oxygen-containing gas into pre-ignition gasification chamber means that discharges into said furnace above said hearth while pre-igniting and commencing gasification of said finely divided carbonaceous material in said oxygen-containing gas in said pre-ignition chamber means so as to discharge into said furnace from said pre-ignition chamber means hot products of gasification and unburned finely divided carbonaceous material at a temperature high enough to enable substantially all carbon in said finely divided carbonaceous material to combine with available oxygen in said furnace to produce hot gas of substantial calorific content that moves upwardly through said body of charge material; discharging steam into said body of charge material at a location in the furnace where the furnace temperature is sufficient to cause reaction between said steam and carbon in said carbonaceous material in said body of charge material to produce hydrogen and carbon monoxide which are added to said gas; discharging liquid carbonaceous material into said shaft of said furnace at a location whereat the gas in said furnace is at a temperature high enough to crack said liquid carbonaceous material and lower the temperature of said gas; and thereafter withdrawing the resulting synthetic gas from the top of said furnace.

2. The method of claim 1 in which said steam is discharged into said body of charge material above the location at which hot products of combustion and unburned finely divided carbonaceous material are discharged into said furnace from said pre-ignition chamber means.

3. The method of claim 1 in which said liquid carbonaceous material is discharged into said shaft of said furnace above the location at which said steam is injected into said furnace.

4. The method of claim 2 in which said liquid carbonaceous material is discharged into said shaft of said furnace above the location at which said steam is injected into said furnace.

5. The method of claim 1 in which said gaseous products of gasification and unburned finely divided carbonaceous material are discharged into said furnace from said pre-ignition chamber means while at a temperature between about 3000° F. and about 3600° F.

6. The method of claim 1 in which said steam is discharged into said furnace to cool gases in the furnace shaft to a temperature between about 1000° F. and about 1800° F.

7. The method of claim 1 in which said liquified carbonaceous material is discharged into said furnace to react with said gas in said furnace at a temperature between about 1000° F. and about 1800° F.

8. The method of claim 1 in which said gaseous products of combustion and unburned finely divided carbonaceous material are discharged from said pre-ignition chamber means into said furnace at a temperature between about 3000° F. and about 3600° F., said steam is discharged into said furnace at a location whereat the temperature is between about 2600° F. and about 2800° F., and said liquid carbonaceous material is discharged into said furnace at a location whereat the temperature is between about 1000° F. and about 1800° F.

9. The method of claim 1 wherein the quantity of said flux material and the temperature in said furnace are controlled to cause the formation in said furnace of slag that collects in a molten pool in the hearth of the furnace.

10. The method of claim 1 in which said slag-producing flux material is basic slag-producing flux material, and reducing conditions are maintained in said furnace so as to cause removal of sulfur from the gas produced in said furnace and collection of said sulfur in the slag produced in said furnace.

11. The method of claim 1 in which said particulate carbonaceous material charged into the furnace is selected from coke, coal, and metallurgical coke that is under size for conventional metallurgical applications.

12. The method of claim 1 in which said finely divided solid carbonaceous material introduced into said pre-ignition chamber is selected from the group consisting of coal, coke, breeze coke, coal char and petroleum coke.

13. The method of claim 1 in which finely divided lime-containing material is introduced into said pre-ignition chamber means along with said finely divided carbonaceous material.

14. The method of claim 1 in which said slag-producing flux material is lime-containing material selected from the group consisting of lime, limestone, dolomite, basic oxygen furnace slag and open hearth slag.

15. The method of claim 14 in which finely divided lime-containing material is introduced into said pre-ignition chamber means along with said finely divided carbonaceous material.

16. The method of claim 1 in which said finely divided solid carbonaceous material introduced into said pre-ignition chamber means is propelled in said pre-ignition chamber means by said oxygen-containing gas at a velocity in excess of the speed of flame propagation.

17. The method of claim 1 in which said oxygen-containing gas introduced into said pre-ignition combustion chamber means is hot air.

18. The method of claim 1 in which said oxygen containing gas introduced into said pre-ignition combustion chamber is substantially pure oxygen.

19. The method of claim 1 in which said oxygen-containing gas introduced into said pre-ignition combustion chamber is a mixture of hot air and additional oxygen.

20. The method of claim 1 in which said liquid carbonaceous material discharged into said furnace is a material selected from the group consisting of oil, tar, asphalt and plastic material.

21. A method of manufacturing synthetic gas having a substantial calorific content, in a large volume slag type shaft furnace such as a blast furnace having a hearth in the lower portion thereof and a shaft above the hearth, which method comprises charging through the top of said furnace charge material comprising particulate solid carbonaceous material and lime-containing slag-producing flux material to form a body of said charge material in the shaft of said furnace, introducing finely divided solid carbonaceous material and oxygen-containing gas into pre-ignition gasification chamber means that opens into said furnace above said hearth while pre-igniting and commencing gasification of said finely divided carbonaceous material in said oxygen-containing gas in said pre-ignition chamber means so as to discharge into said furnace from said pre-ignition chamber means hot products of gasification and unburned finely divided carbonaceous material at a temperature between about 3000° F. and about 3600° F. high enough to enable substantially all carbon in said carbonaceous material to combine with available oxygen in said furnace, to produce hot gas of substantial calorific content that moves upwardly through said body of charge material; discharging steam into said body of charge material at a location above said pre-ignition chamber means where the furnace temperature is between about 2600° F. and about 2800° F. to cause reaction between said steam and carbon in said carbonaceous material to produce hydrogen and carbon monoxide which are added to said gas; discharging liquid carbonaceous material into said shaft of said furnace at a location substantially above the location at which said steam is injected into said furnace and whereat the temperature is between about 1000° F. and about 1800° F., to crack said liquid carbonaceous material and lower the temperature of said gas; and thereafter withdrawing the resulting product gas from the top of said furnace, the quantity of said slag-producing flux material and the temperature in said furnace being controlled to cause the formation in said furnace of slag that collects in a molten pool in the hearth of the furnace.

22. The method of claim 1 in which reducing conditions are maintained in said furnace so as to cause a removal of sulfur from the gas produced in said furnace and collection of said sulfur in said slag.

23. The method of claim 1 in which said particulate carbonaceous burden material charged into the furnace is selected from coke, coal and metallurgical coke that is under size for metallurgical applications.

24. The method of claim 1 in which said finely divided solid carbonaceous material introduced into said pre-ignition chamber means is selected from the group consisting of coal, coke, breeze coke, coal char and petroleum coke.

25. The method of claim 21 in which said slag-producing flux material is selected from the group consisting of lime, limestone, dolomite, basic oxygen furnace slag, and open hearth slag.

26. The method of claim 21 in which finely divided lime-containing material is introduced into said pre-ignition chamber means along with said finely divided carbonaceous material.

27. The method of claim 21 in which said liquid carbonaceous material discharged into said furnace is a material selected from the group consisting of oil, tar, asphalt and plastic material.

28. The method of claim 21 in which said finely divided solid carbonaceous material introduced into said pre-ignition chamber means is propelled in said pre-ignition chamber means by said oxygen-containing gas at a velocity in excess of the speed of flame propagation.

29. A shaft furnace of the type in which charge material including carbonaceous material is charged into the upper portion of the furnace and oxygen containing gas is introduced into the lower portion of the furnace, said furnace comprising a hearth in the lower portion of the furnace, a shaft above the hearth, charging means at the upper portion of said shaft by which charge material essentially comprising particulate solid carbonaceous material and slag-producing flux material is introduced into said furnace to produce in said furnace a body of charge material essentially comprising only said particulate solid carbonaceous material and said flux material; pre-ignition gasification chamber means opening into said furnace above said hearth and associated with means for introducing into said pre-ignition chamber means finely divided solid carbonaceous material and oxygen-containing gas, said pre-ignition chamber means being adapted to operate to ignite, heat, burn, and gasify said finely divided carbonaceous material introduced into said pre-ignition chamber means at a temperature between about 3000° F. and 3600° F., and to discharge into said furnace hot reducing gases along with unburned finely divided carbonaceous material from said pre-ignition chamber means at a temperature high enough to enable substantially all carbon in the carbonaceous material in said furnace in the vicinity of the location of discharge into said furnace from said pre-ignition chamber means to combine with available oxygen in said furnace in said vicinity to produce in said furnace hot gas of substantial calorific content that passes upwardly through said body of charge material in said furnace, said pre-ignition chamber means being adapted to discharge said unburned finely divided carbonaceous material into said furnace at a temperature at least approximating the temperature of the carbonaceous material in the body of charge material in the furnace in the vicinity of the location of discharge into the furnace from said pre-ignition chamber means; means for discharging steam into said furnace above said hearth portion and above and separate from the location at which said pre-ignition chamber means discharges into said furnace; and means at the upper portion of said furnace for withdrawing gas so produced in said furnace.

30. The apparatus of claim 29 comprising means for discharging into said pre-ignition chamber means finely divided carbonaceous material and oxygen-containing gas in proportions to cause partial combustion of said finely divided carbonaceous material in said pre-ignition chamber means so unburned finely divided carbonaceous material is discharged from said pre-ignition chamber into said furnace along with said hot gases.

31. The apparatus of claim 29 in which said pre-ignition chamber means comprises a plurality of individual pre-ignition chambers spaced around the furnace above the hearth and below the shaft of the furnace.

32. The apparatus of claim 31 in which each of said pre-ignition chambers comprises a chamber into one end of which a mixture of finely divided particles of carbonaceous fuel and propelling oxygen containing gas are introduced, and the other end of which opens into said furnace at a location above the level of any molten material in said furnace and at the lower portion of the burden in the stack in said furnace.

33. The apparatus of claim 29 comprisiing means for discharging liquid carbonaceous material into said furnace at a location a substantial distance above the location at which said pre-ignition chamber means discharges into said furnace.

34. The apparatus of claim 29 comprising means for discharging steam into said furnace at a location a substantial distance above the location at which said pre-ignition means discharges into said furnace, and means for discharging liquid carbonaceous material into said furnace at a location a substantial distance above the location where said pre-ignition chamber means discharges into said furnace.

35. The apparatus of claim 34 in which said means for discharging liquid carbonaceous material into said furnace discharges said liquid carbonaceous material into said furnace a substantial distance above the location at which steam is discharged into said furnace.

36. A method of manufacturing synthetic gas having a substantial calorific content, in a large volume slag type shaft furnace such as a blast furnace having a hearth in the lower portion thereof and a shaft above the hearth, which method comprises charging through the top of said furnace charge material, comprising particulate solid carbonaceous material and slag-producing flux material in a size range of particles of material normally charged into a blast furnace in conventional blast furnace practice, to form a body of said charge material in the shaft of said furnace; introducing finely divided solid carbonaceous material and oxygen-containing gas into preignition gasification chamber means that discharges into said furnace above said hearth while igniting, burning, heating and gasifying said finely divided carbonaceous material in said oxygen-containing gas in said pre-ignition chamber means to gasify said finely divided carbonaceous material to produce hot reducing gases that are discharged into said furnace from said pre-ignition chamber means along with unburned finely divided carbonaceous material at a temperature between about 3000° F. and about 3600° F. and high enough to enable substantially all carbon in the carbonaceous material in said furnace in the vicinity of the location of discharge from said pre-ignition chamber means to combine with available oxygen in said furnace in said vicinity to produce hot gas of substantial calorific content that moves upwardly through said body of charge material in said furnace, said unburned finely divided carbonaceous material being discharged into said furnace along with said hot gases from said pre-ignition chamber means at a temperature at least approximating the temperature of the carbonaceous material in the body of charge material in the furnace in said vicinity of the location of discharge of said heated finely divided carbonaceous material into said furnace from said preignition chamber means; and withdrawing from the upper portion of said furnace the gas so produced.

37. The method of claim 36 in which steam is introduced into the body of charge material in said furnace at a location in the furnace where the furnace temperature is sufficient to cause reaction between said steam and carbon in said carbonaceous material in said body of charge material to produce hydrogen and carbon monoxide which are added to said hot gas in said furnace.

38. The method of claim 36 in which liquid carbonaceous material is discharge into said furnace at a location in the furnace where said hot gas in said furnace is at a temperature high enough to crack said liquid carbonaceous material and lower the temperature of said hot gas in said furnace.

39. The method of claim 36 in which steam is discharged into said body of charge material in said furnace at a location in the furnace where the furnace temperature is sufficient to cause reaction between said steam and carbon in said carbonaceous material in said body of charge material to produce hydrogen and carbon monoxide which are added to said hot gas in said furnace, and in which liquid carbonaceous material is discharged into said furnace at a location in the furnace where said hot gas in said furnace is at a temperature high enough to crack said liquid carbonaceous material and lower the temperature of said hot gas in said furnace.

40. The method of claim 36 in which said body of charge material in said furnace contains material that cools said hot gas passing upwardly through said furnace without reducing its caloric content.

41. The method of claim 36 in which said finely divided solid carbonaceous material introduced into said pre-ignition chamber means is propelled in said pre-ignition chamber means by said oxygen-containing gas at a velocity in excess of the speed of flame propagation.

* * * * *